US010814948B2

(12) United States Patent
Carvalhar Marins et al.

(10) Patent No.: US 10,814,948 B2
(45) Date of Patent: Oct. 27, 2020

(54) ELECTRIC POWER GENERATING SUBMARINE TOOL

(71) Applicant: FMC TECHNOLOGIES DO BRASIL LTDA, Rio de Janeiro (BR)

(72) Inventors: Alexandre Carvalhar Marins, Niterói (BR); Arthur Eugênio De Almeida Filho, Rio de Janeiro (BR); Rodrigo Silva Cappato, Rio de Janeiro (BR); Ricardo Vianna Ramos, Rio de Janeiro (BR)

( * ) Notice: Subject to any disclaimer, the term of this patent is extended or adjusted under 35 U.S.C. 154(b) by 137 days.

(21) Appl. No.: 15/754,923

(22) PCT Filed: Aug. 17, 2016

(86) PCT No.: PCT/BR2016/050205
§ 371 (c)(1),
(2) Date: Feb. 23, 2018

(87) PCT Pub. No.: WO2017/031564
PCT Pub. Date: Mar. 2, 2017

(65) Prior Publication Data
US 2019/0337601 A1 Nov. 7, 2019

(30) Foreign Application Priority Data
Aug. 25, 2015 (BR) .............. 102015020512

(51) Int. Cl.
B63G 8/00 (2006.01)
B63C 11/52 (2006.01)
(Continued)

(52) U.S. Cl.
CPC .............. B63C 11/52 (2013.01); B63G 8/001 (2013.01); F03B 13/10 (2013.01); H02G 1/10 (2013.01);
(Continued)

(58) Field of Classification Search
CPC .......... B63C 11/52; H02N 11/00; H02K 5/12; H02G 1/10; F03B 13/10; B63G 8/001;
(Continued)

(56) References Cited

U.S. PATENT DOCUMENTS 3,546,474 A * 12/1970 De Courcy ........... H02J 7/1415
290/52
4,496,847 A * 1/1985 Parkins ................. F03D 7/0276
290/44

(Continued)

FOREIGN PATENT DOCUMENTS

GB 2 460 832 A 12/2009
GB 2 521 626 A 7/2015
(Continued)

OTHER PUBLICATIONS

International Search Report of the International Searching Authority issued in PCT/BR2016/050205 dated Jan. 27, 2017 (3 pages).
(Continued)

Primary Examiner — Edwin J Toledo-Duran
(74) Attorney, Agent, or Firm — Osha Liang LLP

(57) ABSTRACT

An electric power generating submarine tool is used in the Oil and Gas Industry, for powering submarine equipments applied for combating hydrate and also for feeding electric systems in submarine equipments of production, processing and transporting hydrocarbons. The tool includes a hydraulic engine of axial piston, a mechanical coupling, an electric power generator, an electric box of hydrostatically balanced delivery, a hydrostatically balanced submarine electric cable, a wet-mate-type submarine electric connector, hydraulic hoses, a compensator for allowing equalization of the internal pressure with the external one. The system is interconnected and driven hydraulically by a ROV.

9 Claims, 3 Drawing Sheets

(51) Int. Cl.
*F03B 13/10* (2006.01)
*H02G 1/10* (2006.01)
*H02K 5/12* (2006.01)
*H02N 11/00* (2006.01)

(52) U.S. Cl.
CPC ............... *H02K 5/12* (2013.01); *H02N 11/00* (2013.01); *B63G 2008/004* (2013.01); *B63G 2008/007* (2013.01)

(58) Field of Classification Search
CPC ........ B63G 2008/007; B63G 2008/004; Y02P 70/527; Y02E 10/28
See application file for complete search history.

(56) References Cited

U.S. PATENT DOCUMENTS

| | | | | |
|---|---|---|---|---|
| 5,075,014 | A * | 12/1991 | Sullivan | E02B 15/106 210/747.6 |
| 5,295,848 | A * | 3/1994 | Mohn | B63C 11/52 439/191 |
| 5,301,096 | A * | 4/1994 | Klontz | H02J 5/005 363/37 |
| 6,167,831 | B1 * | 1/2001 | Watt | B63G 8/001 114/245 |
| 6,223,675 | B1 * | 5/2001 | Watt | B63G 8/001 114/312 |
| 6,250,199 | B1 * | 6/2001 | Schulte | E21B 33/0355 60/398 |
| 6,257,162 | B1 * | 7/2001 | Watt | B63G 8/001 114/244 |
| 6,371,693 | B1 * | 4/2002 | Kopp | F16L 53/37 405/158 |
| 6,390,012 | B1 * | 5/2002 | Watt | B63B 27/36 114/322 |
| 6,998,724 | B2 * | 2/2006 | Johansen | E21B 33/0355 166/65.1 |
| 7,183,742 | B2 * | 2/2007 | Potter | B63G 8/001 166/338 |
| 8,511,389 | B2 * | 8/2013 | Fenton | E21B 33/0385 166/368 |
| 8,657,011 | B2 * | 2/2014 | Vyas | E21B 33/0355 166/335 |
| 8,779,614 | B2 * | 7/2014 | Yarnold | E21B 41/0085 290/54 |
| 9,080,425 | B2 * | 7/2015 | Zediker | B63G 8/001 |
| 2003/0167998 | A1 * | 9/2003 | Huntsman | B63G 8/08 114/312 |
| 2003/0178200 | A1 * | 9/2003 | Fox | E21B 7/124 166/341 |
| 2005/0179263 | A1 * | 8/2005 | Johansen | E21B 33/0355 290/1 R |
| 2006/0006656 | A1 * | 1/2006 | Smedstad | F03G 7/05 290/43 |
| 2008/0257559 | A1 * | 10/2008 | Grimseth | E21B 34/16 166/375 |
| 2008/0265583 | A1 * | 10/2008 | Thompson | F01D 5/141 290/54 |
| 2008/0282776 | A1 * | 11/2008 | Loeb | F04B 17/03 73/49.5 |
| 2009/0038804 | A1 * | 2/2009 | Going, III | E21B 34/10 166/335 |
| 2009/0107388 | A1 * | 4/2009 | Crowell | B63C 7/26 114/336 |
| 2009/0114140 | A1 * | 5/2009 | Guerrero | B63C 11/52 114/321 |
| 2010/0289267 | A1 * | 11/2010 | Jang | F03B 13/08 290/53 |
| 2011/0012369 | A1 * | 1/2011 | Grossman | F03B 17/04 290/1 R |
| 2011/0042323 | A1 * | 2/2011 | Sullivan, II | E02B 15/048 210/744 |
| 2011/0126912 | A1 * | 6/2011 | Grimseth | E21B 33/0355 137/1 |
| 2011/0158824 | A1 * | 6/2011 | Wright | B01D 19/0042 417/53 |
| 2011/0240303 | A1 * | 10/2011 | Hallundbaek | B63C 11/42 166/339 |
| 2011/0294380 | A1 * | 12/2011 | Al-Sharif | B63B 21/508 441/5 |
| 2011/0305518 | A1 * | 12/2011 | Pearce | B63B 35/44 405/75 |
| 2012/0000663 | A1 * | 1/2012 | Mebarkia | E21B 43/01 166/336 |
| 2013/0043034 | A1 * | 2/2013 | Drablier | E21B 33/0355 166/338 |
| 2013/0153038 | A1 * | 6/2013 | Barden | G01M 3/005 137/1 |
| 2013/0168970 | A1 * | 7/2013 | Grossman | F03B 17/04 290/1 A |
| 2014/0042975 | A1 * | 2/2014 | Miller | H02J 7/00 320/127 |
| 2015/0307173 | A1 * | 10/2015 | Moles | B63G 8/001 307/9.1 |
| 2016/0115936 | A1 * | 4/2016 | Knox | F03B 13/10 415/36 |
| 2016/0318591 | A1 * | 11/2016 | Jamieson | H02K 7/1807 |
| 2018/0106236 | A1 * | 4/2018 | Lee | F03B 13/10 |
| 2018/0171759 | A1 * | 6/2018 | Meyer | E21B 34/04 |

FOREIGN PATENT DOCUMENTS

| | | |
|---|---|---|
| WO | 2009/129560 A1 | 10/2009 |
| WO | 2011/071392 A1 | 6/2011 |
| WO | 2014/120058 A1 | 8/2014 |

OTHER PUBLICATIONS

Written Opinion of the International Searching Authority issued in PCT/BR2016/050205 dated Jan. 27, 2017 (5 pages).
International Preliminary Report on Patentability from PCT/BR2016/050205 completed on Nov. 30, 2017 (5 pages).

* cited by examiner

ELECTRIC POWER GENERATING SUBMARINE TOOL

FIELD OF THE INVENTION

The present invention refers to an electric power generating submarine tool, to be used in the Oil and Gas Industry, for powering submarine equipments applied for combating hydrate and also for feeding electric systems in submarine equipments of production, processing and transporting hydrocarbons.

This tool generates electric power from the hydraulic power of a ROV (Remote Operated Vehicle). This ROV will be dedicated and at the disposal, only for this purpose, during the whole time necessary for generating electric power.

BACKGROUND OF THE INVENTION

In general, the power supply to a submarine production system is designed according to the submarine control system. Different types of control systems can be used (direct hydraulic, electro-hydraulic, electric only, etc.) that require different power systems projects. However, two types of power systems are used: electric power system and hydraulic power system. [1]

In most cases the power availability is provided through PSU (Production Stationary Units) such as platforms and FPSOs (Floating Production Storage & Offloading), requiring long lengths of electrical cable installed in the seabed, in addition to other electrical delivery equipments, which increases the CAPEX (capital expenditure) and OPEX (operational expenditure) of submarines systems. To preview contingency situations, solutions can be added to submarines systems further increasing the cost of projects.

Other power source may be through installation operation vessels such as PLSV (Pipe Line Support Vessel) and RSV (ROV Support Vessel), which although they have lower costs when compared to UEP they also have too much complexity requiring reinforced electric cables, coils, power source topside and protection systems for electrical network, requiring a considerable time of operation and operational risk.

Some ROV manufacturers have introduced customized solutions for submarine electric power supply. Among them, the one that is to use an electric cable connected to one of its end to the electrical circuit of the ROV and the other end which can be connected to ROV panel of submarine equipments and/or tools. Although this type of solution has lower cost and shorter time of operation, its application depends on the electric power required by the submarine system since ROV has some limitations on its electrical circuit as the power supply capacity as to the need of protection circuits in the vehicle. In some cases, some ROV functions can be turned off to increase the power supply (e.g. lighting circuit) under certain operating conditions.

Other solutions such as submarine batteries have been used in small ROV of search and inspection.

Petroleum fields' operators have faced too much problems with the problem of availability of electric power sources available in submarine environment to enable some operations such as remediation and aid in the combat to hydrate aiming to have its dissociation, monitoring independent systems, among others.

Power generating systems offshore currently available are complex, requiring big reserved area and classified for installation and operation of these systems on topside of welds, platforms and vessels of installation, operation vessel and intervention. The project in big part requires long lengths of electric cables installed in the seabed, in addition to other electric delivery equipments, which increases the cost of purchase, installation and operation of the submarine systems.

The availability of electric power through ROV circuit is limited, reaching approximately 2.2 KW. To reach a little bit more of electric power there is the possibility of turning off the lighting function of the ROV, what it is not highly recommended. Regarding the use of ROV electric circuit, the protection system must be designed to prevent damages and the loss of ROV position when submerged.

The solutions with batteries have problems regarding the amount of batteries necessary for generating low power, resulting in heavier equipments/tools. In addition, this solution has to meet all national and international norms requirements for transportation, storage and discard. In addition, it is necessary a charger to supply reloads to the battery, which further increases the cost of such solution.

BRIEF DESCRIPTION OF THE INVENTION

The present invention refers to an electric power generating submarine tool able to enable the electric power enough for operations of installation or intervention in tools and/or submarine equipments requiring such need when submerged.

This tool is constituted of a hydraulic engine, a mechanical coupling, an electric power generator, electric box of hydrostatically balanced delivery, a hydrostatically balanced submarine electric cable, a wet-mate-type submarine electric connector and an amperage reading system.

DETAILED DESCRIPTION OF THE INVENTION

Figure 1:
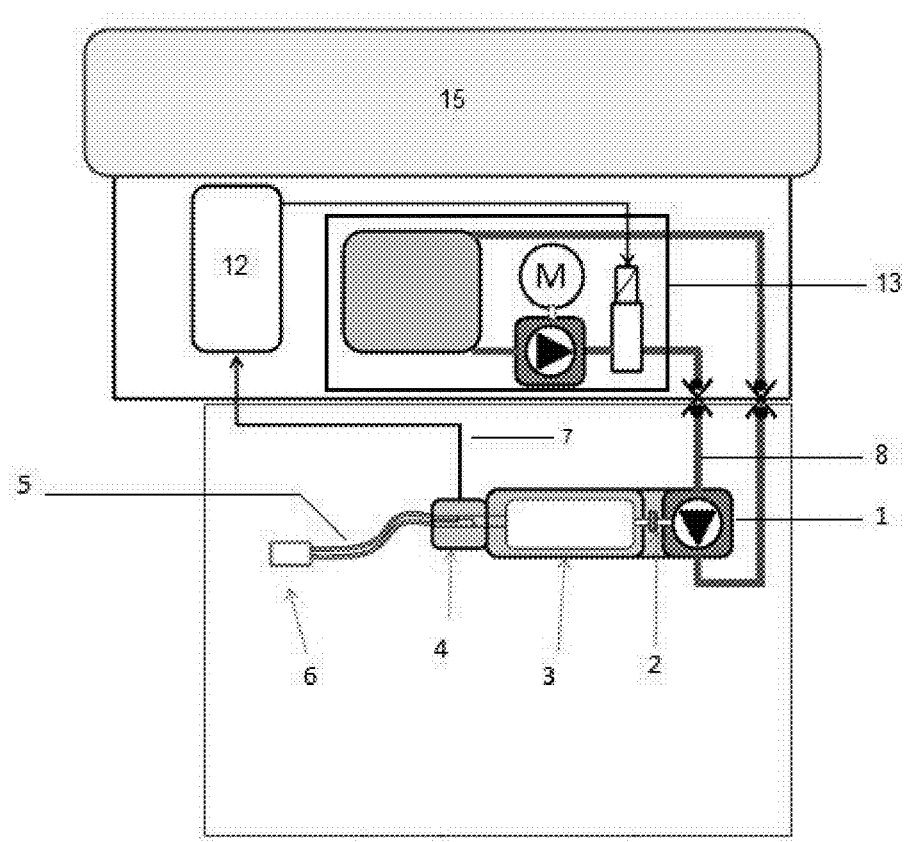
FIG. 1: Represents the schematic of the Tool coupled to ROV.
Figure 2:
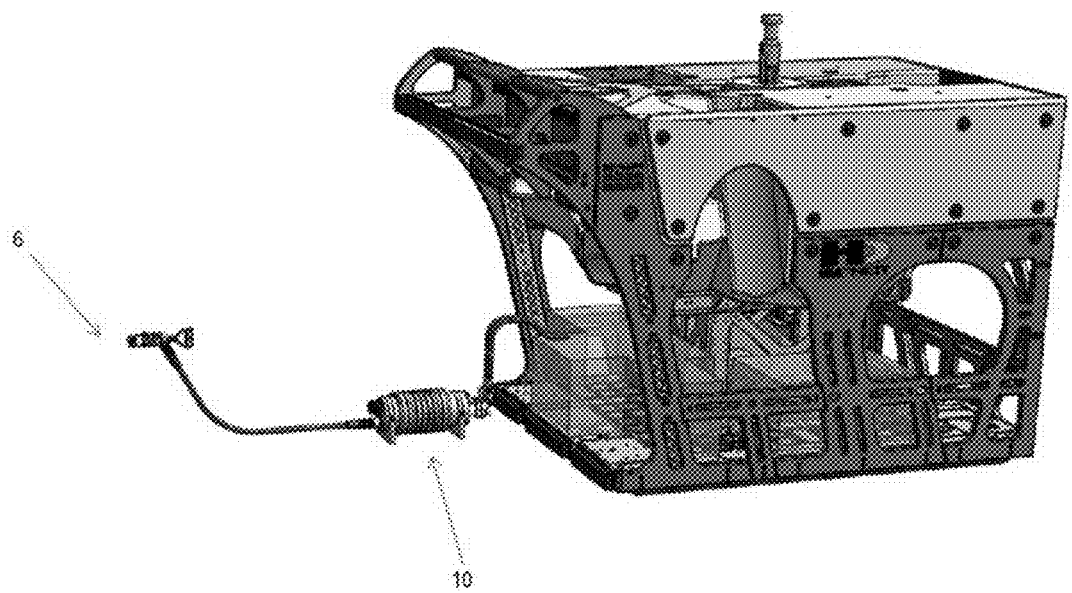
FIG. 2: Drawing of the concept of the Tool coupled to ROV.
Figure 3:
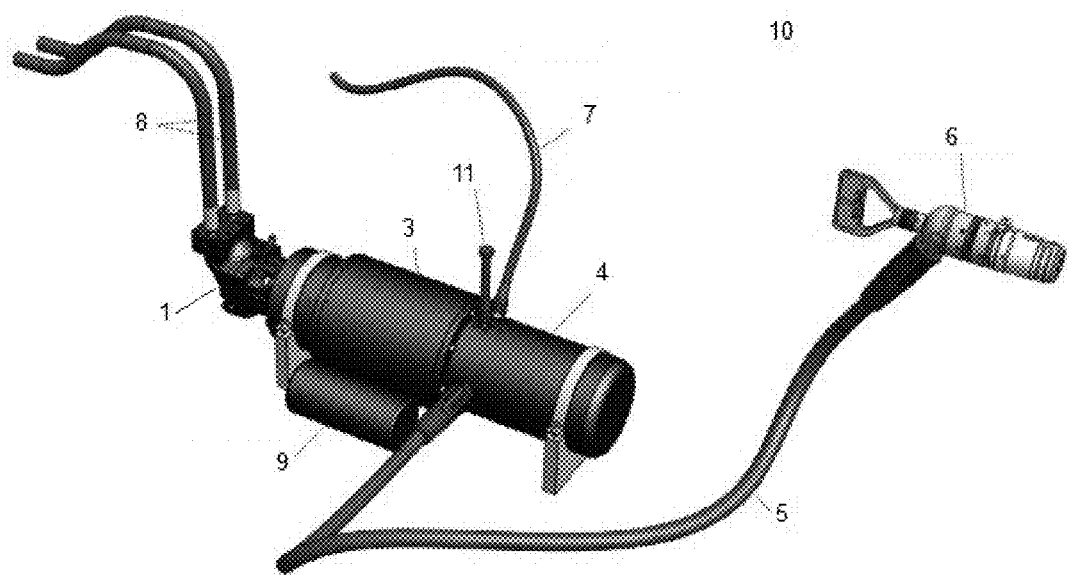
FIG. 3: Represents the schematic of the Tool.

According to the figures mentioned, it is noted that the electric power generating submarine tool (10) comprises a hydraulic engine of axial piston (1) provided with a mechanical coupling (2) interconnecting it to an electric power generator (3) which, in turn, is sequenced by an electric box of hydrostatically balanced delivery (4), which is provided with a hydrostatically balanced submarine electric cable (5) extending outside the said electric box of hydrostatically balanced delivery (4) and is provided in its end of a wet-mate-type submarine electric connector (6), in addition to serial cables (7) and a dummy plug (11) for protecting the communication spare electric connector Ethernet or RS232, wherein the said mechanical coupling (2) is also provided with hydraulic hoses (8) interconnecting it to the hydraulic system (13) of ROV (15), being also the said electric power generator (3) has a pressure compensator (9) interconnected to it adjacently, to enable equalizing the internal pressure with the external one, and an amperage reading system using the electric interface (12) (ROV-Electr.-ROV Electrical Interface) of the ROV, through a communication cable Ethernet or RS232.

The electric power generating submarine tool (10) is driven hydraulically and is able to operate with flow rates from 50 l/min to 130 l/min at constant pressure of 2500 psi available by ROV (15). The minimum flow rate generated by ROV (15) is enough to drive the hydraulic engine (1) of the tool (10) transmitting the torque via mechanical coupling (2) to the electric power generator shaft (3). This generator (3) is able to provide least 14 kW-650 VDC of electric power to submarine tools or equipments needing electric power.

The hydraulic interconnection of the tool with hydraulic supply (13) of the ROV (15) is performed through conventional hydraulic connections (8) of type JIC-6 (JIC—Joint Industry Council) or similar.

A hydrostatically balanced electric delivery box (4) is connected to the electric generator (3) and to the submarine electric cable (5). From this electric delivery box (4) serial cables (7) (RS-232 and Ethernet) are derived for amperage reading of the tool available in the control room topside of ROV.

An electric cable passes inside a balanced hose (5) to support the hydrostatic pressure and is connected to the electric power generator (3) through a JB (4) (Pressure Compensated Junction Box) in one of its ends. On the other end, it is ended in a wet-mate type plug connector (6) appropriate for operations with ROV.

The tool (10) at issue is designed in a light and compact form to enable its submarine transportation while coupled to the ROV (15) structure. For this tool, it is estimated a weight lower than 100 kg (submerged weight).

The invention of the electric power generating submarine tool (10) is a solution having great advantages when compared to other sources of submarine electric powers commercially available.

The electric power generating submarine tool (10) provides an optimized logistics regarding storage, conditioning and transportation in the several modals (land, air and marine) due to its low weight and reduced dimensions. In cases of submarine operations of contingencies it may be easily shipped.

The electric power generating submarine tool (10) provides a reduction in the operations time, since it is a tool designed for meeting all interfaces with ROV regarding its coupling/fixation to the remote vehicle structure, its driving through hydraulic supply (13) of the ROV (15) and the interface with the ROV-type electric connector (6) for moving the electric cable (5) and the coupling in the submerged equipment panel.

The electric power generating submarine tool (10) meets the need of electric systems of submarine tools and/or equipments with low power demand, not being necessary the systems mobilization elaborated and/or even the deviation of electric power cables of submarine systems for using in certain operations (e.g. contingency operation).

The electric power generating submarine tool (10) provides low maintenance since it is a low complexity system, with a few components already qualified by norm and in submarine environments in its molding.

The electric power generating submarine tool (10) is driven by hydraulic supply (13) of ROV (15) that drives the hydraulic engine (1) of the tool. This hydraulic engine (1) transmits torque to a mechanical coupling (2) joining the engine (1) to an electric power generator (3). This generator (3) is coupled to a delivery box (4) of electric power that is hydrostatically balanced. This box (4) is coupled to a submarine electric cable (5) designed to resist to hydrostatic pressure and the electric power generated by the tool circuit. This electric cable (5) must be able to be handled by ROV and connect the electric connector (6) in its end to the panel ROV of submerged tools and/or equipments.

The invention claimed is:

1. An electric power generating submarine tool comprising a hydraulic engine provided with a mechanical coupling interconnecting the hydraulic engine to an electric power generator which, in turn, is sequenced by an electric box of hydrostatically balanced delivery which is provided with a hydrostatically balanced submarine electric cable that extends outside the said box and an end of the hydrostatically balanced submarine electric cable is provided with a wet-mate-type submarine electric connector, the electric box also having serial cables and a dummy plug coupled thereto, wherein the said mechanical coupling is also provided with hydraulic hoses interconnecting the mechanical coupling to a hydraulic system of an ROV, also wherein the said electric power generator has a pressure compensator interconnected adjacently to the electric power generator, and an ampere reading system interconnected to an electric interface of the ROV.

2. The tool according to claim 1, wherein the electric power generating submarine tool is driven hydraulically and operates with flow rates of 50 l/min to 130 l/min, under constant pressure of 2500 psi.

3. The tool according to claim 1, wherein the hydraulic engine is hydraulically driven by the hydraulic system of the ROV and transmits torque via the mechanical coupling to an electric power generator shaft of the electric power generator, providing at least 14 kW-650 VDC of electric power for submarine tools or equipment.

4. The tool according to claim 2, wherein a hydraulic interconnection between the electric power generating submarine tool and the hydraulic system of the ROV is provided by the hydraulic hoses.

5. The tool according to claim 1, wherein the hydrostatically balanced electric delivery box is connected to the electric generator and to the submarine electric cable, and provided with serial cables for amperage reading.

6. The tool according to claim 1, wherein the electric cable is connected to the electric power generator through the hydrostatically balanced electric delivery box.

7. The tool according to claim 1, wherein the amperage reading system uses the electric interface, through a communication cable.

8. The tool according to claim 1, wherein the compensator equalizes an internal pressure with an external pressure.

9. The tool according to claim 1, wherein the dummy plug protects a communication spare electric connector.

* * * * *